Figure 3:
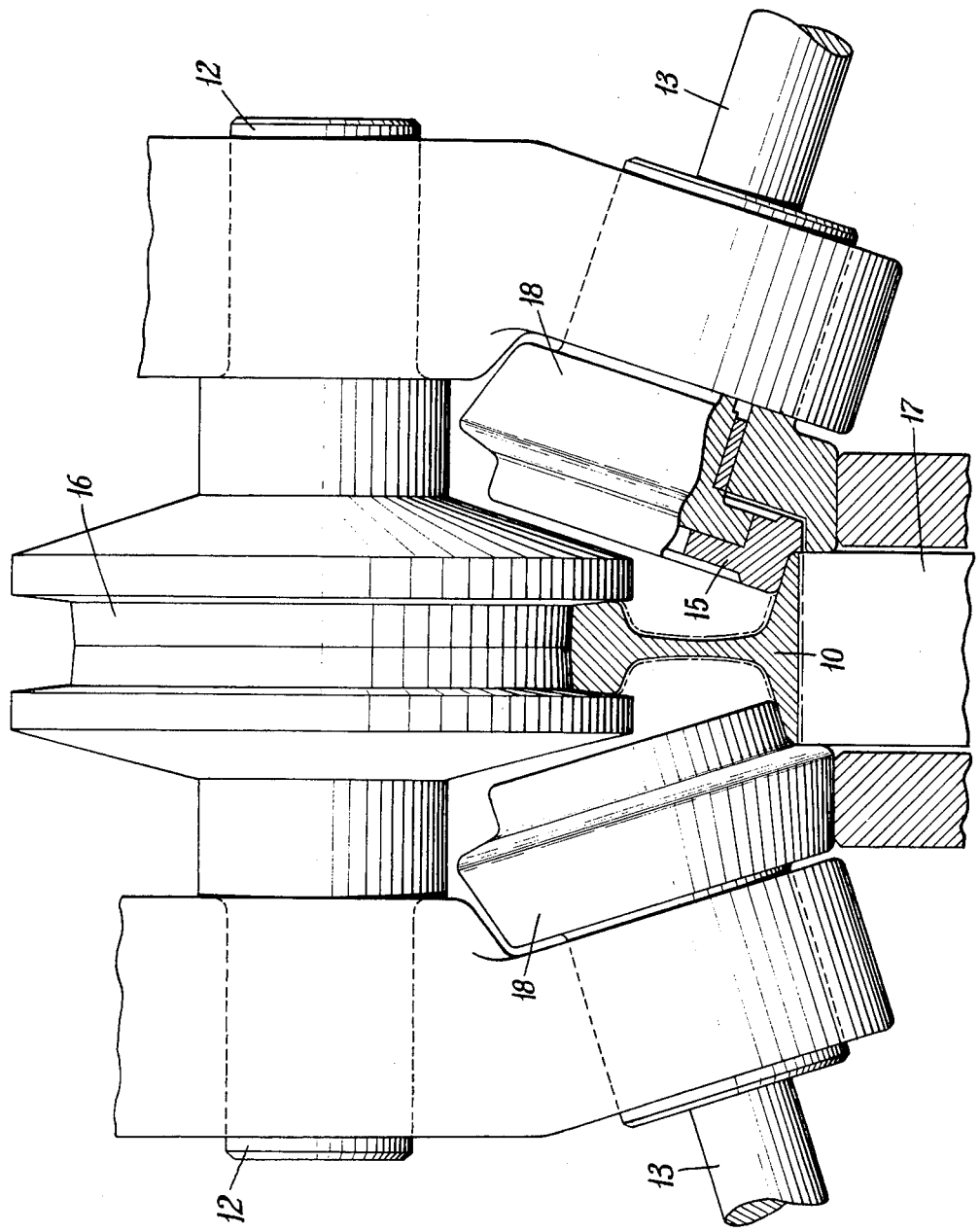

June 30, 1964  R. H. BENNEWITZ  3,138,858
RAIL WELD ROLL FORGING
Filed Aug. 26, 1960  2 Sheets-Sheet 1
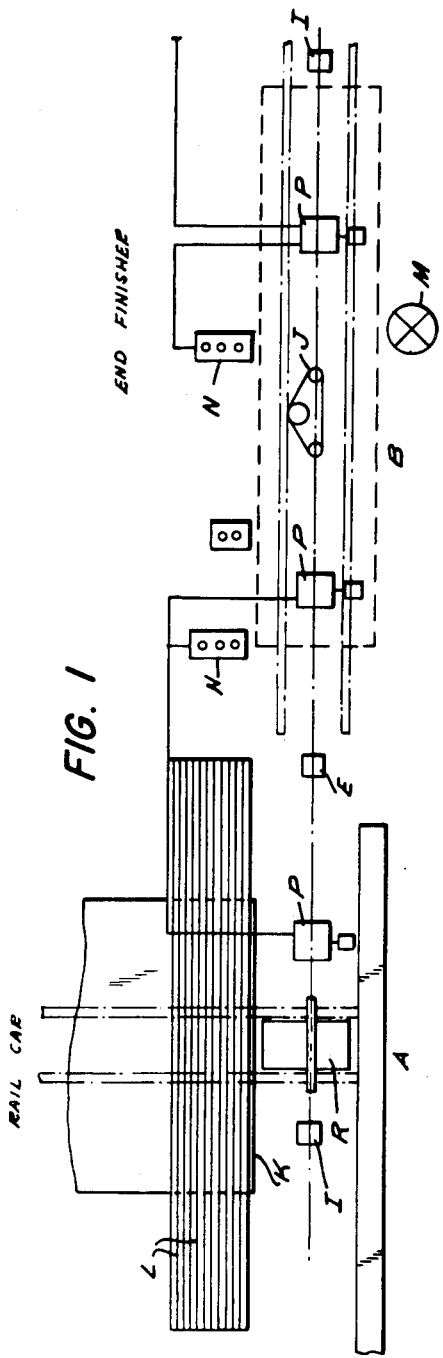
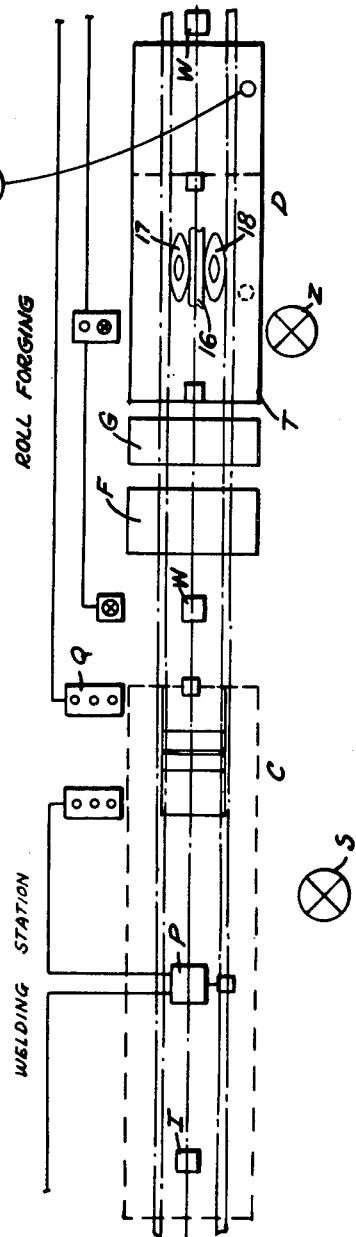
INVENTOR.
ROBERT H. BENNEWITZ
BY
William F. Mesinger
ATTORNEY

INVENTOR.
ROBERT H. BENNEWITZ

United States Patent Office 3,138,858
Patented June 30, 1964

3,138,858
RAIL WELD ROLL FORGING
Robert H. Bennewitz, Chicago, Ill., assignor to Union Carbide Corporation, a corporation of New York
Filed Aug. 26, 1960, Ser. No. 52,133
9 Claims. (Cl. 29—429)

This invention relates to rail weld roll forging, and constitutes an improvement on the copending joint application of myself, Hedlund and Wethe, Serial No. 36,999, filed June 17, 1960, the entire disclosure of which by this reference is hereby incorporated into this application.

The reduction of the excess weld upset metal disclosed in that copending application is costly and time consuming, and it is therefore the main object of the present invention to provide less expensive and faster method and apparatus for reducing the excess weld upset metal of pressure welded railroad rail.

According to the present invention, in the production of pressure butt welded rails, the incoming rails are fed in succession into a production line containing power rolls and power pinch rolls spaced therealong. The power rolls are energized to advance the rails in succession to a welding station where they are pressure butt welded together and a weld upset is produced. The power pinch rolls beyond the welding station are energized to advance the welded joint to a weld upset rolling station where the upset is roll forged to reduce the excess weld metal.

Preferably, the power pinch rolls advance the welded rail to a reheating station where the weld upset is reheated to a roll forging temperature, before the welded joint is brought to the weld upset rolling station.

Preferably, the power pinch rolls advance the welded rail to a trimming station wherein the bulk of the pressure weld upset is trimmed off, before the welded joint is brought to the weld upset rolling station.

In the drawings:

FIGS. 1 and 2 in succession form a plan of the production line of the system; and FIG. 3 is an elevation, partly in section, of the weld reduction rolls at the roll forging station.

As shown in FIGURES 1 and 2, at the feeding station A the incoming rails are fed in succession to the production line which leads to the end finisher station B, where the ends of the rail lengths are ground off square in preparation for welding.

From the finisher station B the ground rails pass along the production line to the welding station C, where the ground ends are welded together. When the weld is completed, the ribbon thus produced is advanced along the production line to bring the weld to the weld grinder station D, where the weld upset is ground off of the ribbon rail joint.

At the feeding station A, the incoming rail lengths L are unloaded by a crane onto a rack K at one side of the production line, from which they are fed in succession by a self-propelled shuttle carriage R having an elevator which rises under and lifts the first rail from the rack. The car then returns to transfer the rail onto the line where the elevator lowers the rail onto power rolls P and idler support rolls I of the production line.

The power rolls advance the rail over a lifter roll E on to a stop at the end finisher station B, where a belt grinder J is moved bodily across the stopped oncoming end of the rail. The power rolls then advance the rail length, and a return pass of the belt grinder J squares the trailing end of the rail. The operator indicator at M by means of controls N at the end finisher station B controls all of the movement of the rail at feeding station A up to and through the end grinder station B.

From the end finisher station B the rail is advanced to an optional cleaning and deburring station (not shown) on to the welding station C where the ground ends of the rail section are abutted, aligned, pressurized, and oxy-fuel pressure welded. The welded rail thus produced passes on over idler rolls I and power pinch rolls W under the control of an operator indicated at S by means of controls Q for the entire subsequent length of welded rail produced.

From the welding station C the ribbon rail passes to the weld upset reducing station D where the weld upset portions on the upper and lower sides, flat bottom, round top and optionally both sides of the web are reduced by roll forging. In the form shown, a trimming station F is interposed between the welding station C and the roll forging station D to remove the bulk of the upset weld metal. Preferably, this trimming is done by an oxy fuel scarfing blowpipe, suitably mechanized. The upset metal may also be machined away by hot milling. In the form shown, a reheating station G is interposed between the welding station C and the roll forging station D. This reheating to a roll forging temperature not in excess of about 2200° F. is preferably accomplished by oxy fuel flames suitably directed against the rail joint.

The roll forging station is shown in greater detail in FIG. 3. The upset of the ball of the rail 10 is roll forged by a top roll die 16 on a shaft 12 journaled on a horizontal axis above the rail. The weld upset on the bottom of the rail 10 is roll forged by a bottom roll die 17 journaled on a horizontal axis below the rail. The rail base edge weld upsets are roll forged by edge roll burnishing dies 15 supported by rolls 18 on shafts 13. The axes of the shafts 12 and 13 and the shaft for the bottom roll 17 preferably are in the same plane normal to the longitudinal axis of the rail. A pair of web roll dies not shown may be mounted to roll out the weld upset on the web section, but this is not normally required.

The rail may be moved back and forth through the dies, or the assembly of roll dies may be moved back and forth along the stationary rail. In either case, the rolls are motor driven, under the control of the operator indicated at Z.

The reheating step and the roll-forging step are the most important elements of the new method. The new apparatus combination comprises the end grinder, the pressure welder, the trimming means, and the roll forging means for the remaining upset flush with the rail surface.

The advantages of the new roll forging method and apparatus are that they are more economical then grinding, they are completely automatic, and a metallurgical improvement to the weld metal is effected by the hot-working of the metal, causing the grains which are enlarged somewhat by welding, to be refined desirably.

What is claimed is:

1. Method of production of pressure butt welded railroad rail, which comprisees feeding the incoming rails in succession into a production line containing power rolls engaging the base flanges of the rails and power pinch rolls spaced therealong and engaging the base flanges and the head of the rail respectively therebetween, energizing said power rolls to apply traction to said base flanges of the rail and advance said rails in succession to a welding station where they are pressure butt welded together end to end and a transverse weld on the ball, web and flange portions thereof upset is produced, and energizing said power pinch rolls beyond said welding station to exert downward pressure on the rail head and to apply traction to the base flanges of the rail and advance the welded rail to bring the welded joint to a weld upset rolling station containing an assembly of roll dies where the rail is maintained stationary while said assembly of roll dies is moved back and forth along the top and sides of the ball portion of said pressure weld upset for roll forging the ball portion of said pressure weld upset to reduce the excess weld metal.

2. Method as claimed in claim 1, in which the power pinch rolls advance the welded rail to a reheating station wherein the weld upset is reheated to a roll forging temperature, before the welded joint is brought to the weld upset rolling station, and in which weld upset rolling station the weld upset on the bottom of the rail and the rail base edge weld upsets are also roll forged.

3. Method as claimed in claim 2, in which the roll forging temperature is not in excess of about 2200° F.

4. Method as claimed in claim 1, in which the power pinch rolls advance the welded rail to a trimming station wherein the bulk of the ball portion of said pressure weld pressure weld upset is trimmed off, before the welded joint is brought to the weld upset rolling station.

5. Method as claimed in claim 4, in which the weld upset is trimmed off of said rail ball and flange portions to within one sixteenth of an inch of the original rail surface.

6. Method as claimed in claim 1, in which the power pinch rolls advance the welded rail to a scarfing station wherein the pressure weld upset is trimmed off to a depth within one sixteenth of an inch of the original surface, and then to a reheating station wherein the scarfed weld upset is reheated to a temperature not in excess of about 2200° F., both before the welded joint is brought to the rolling station, and the scarfing and reheating are both by the use of oxy fuel flames.

7. Method as claimed in claim 1, in which the top of the weld upset is roll forged flush with the surface of the rail ball, and the bottom of the weld upset is roll forged flush with the bottom of the rail flange.

8. Apparatus for production of pressure butt welded railroad rail, which comprises power rolls engaging the base flanges of the rails and power pinch rolls spaced along a production line and engaging the base flanges and the head of the rail respectively therebetween, means for feeding the incoming rails in succession into said production line, means for energizing said power rolls to apply traction to said base flanges of the rail and advance said rails in succession to a welding station, means at said welding station for pressure butt welding said rails together end to end and producing a transverse weld upset on the ball, web and flange portions thereof, means for energizing said power pinch rolls beyond said welding station to exert downward pressure on the rail head and to apply traction to the base flanges of the rail and advance the welded rail to bring the welded joint to a weld upset rolling station, and means at said rolling station containing an assembly of roll dies and where the rail is maintained stationary for moving said assembly of roll dies back and forth along the top and sides of the ball portion of said stationary rail for roll forging the weld ball portion of said pressure weld upset to reduce the excess weld metal.

9. Apparatus as claimed in claim 8, in which said weld upset rolling station comprises top and bottom forging rolls, and flange burnishing rolls on each side.

References Cited in the file of this patent
UNITED STATES PATENTS

| | | |
|---|---|---|
| 1,068,467 | Vassen | July 29, 1913 |
| 1,662,332 | Pugh | Mar. 13, 1928 |
| 1,837,494 | Sessions | Dec. 22, 1931 |
| 2,120,316 | Stone | June 14, 1938 |
| 2,124,849 | Drain | July 26, 1938 |
| 2,175,616 | Reed | Oct. 10, 1939 |
| 2,231,014 | Lytle et al. | Feb. 11, 1941 |
| 2,761,208 | Mitchell | Sept. 4, 1956 |
| 2,787,698 | Schlatter et al. | Apr. 2, 1957 |

FOREIGN PATENTS

| | | |
|---|---|---|
| 5,644 | Great Britain | Dec. 24, 1881 |
| 350,246 | Great Britain | June 11, 1931 |